US007444002B2

United States Patent
Teku et al.

(10) Patent No.: US 7,444,002 B2
(45) Date of Patent: Oct. 28, 2008

(54) VEHICULAR TARGET ACQUISITION AND TRACKING USING A GENERALIZED HOUGH TRANSFORM FOR MISSILE GUIDANCE

(75) Inventors: Hagos Teku, Tucson, AZ (US); Thomas K. Lo, Oro Valley, AZ (US); Nikki J. Lawrence, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 565 days.

(21) Appl. No.: 10/858,741

(22) Filed: Jun. 2, 2004

(65) Prior Publication Data

US 2005/0271248 A1 Dec. 8, 2005

(51) Int. Cl.
*G06K 9/00* (2006.01)
*F41G 7/00* (2006.01)
(52) U.S. Cl. .................. 382/103; 382/295; 244/3.15
(58) Field of Classification Search ............ 382/103, 382/106, 107, 168, 181, 191, 170, 193, 201, 382/203, 232, 242, 255, 274, 276, 287–298, 382/209, 243, 275; 244/3.15; 250/203.2
See application file for complete search history.

(56) References Cited

U.S. PATENT DOCUMENTS

| 4,685,143 | A | * | 8/1987 | Choate ...................... 382/170 |
| 5,953,452 | A | * | 9/1999 | Boone et al. ................ 382/199 |
| 6,196,496 | B1 | * | 3/2001 | Moskovitz et al. ......... 244/3.15 |
| 6,265,704 | B1 | * | 7/2001 | Livingston ............... 250/203.2 |
| 7,146,057 | B2 | * | 12/2006 | Clark et al. ................. 382/242 |

\* cited by examiner

*Primary Examiner*—Seyed Azarian
(74) *Attorney, Agent, or Firm*—Noblitt & Gilmore, LLC

(57) ABSTRACT

A generalized Hough transform is used to acquire and track vehicular targets for missile guidance. This is accomplished by recognizing that most vehicles have silhouettes that may be described as a "rounded rectangle". The position and shape of such rounded rectangles is described in terms of 5 parameters ($x_c$, $y_c$, a, b, $\theta$) where $x_c$, $y_c$ are the center coordinates, a,b are the major and minor axis and $\Theta$ is the orientation. The computation of a five dimensional Hough transform on an image including such a target will produce the five parameters that provide the "best fit" rounded rectangle to the target. These parameters are then passed to a missile tracker. This capability can be used to improve track gate handoff from the automatic target recognizer (ATR) to the missile tracker, changing aspect ratios of maneuvering targets, limited lock-on after launch (LOAL), aimpoint designation and fire control system to missile seeker handover.

29 Claims, 10 Drawing Sheets

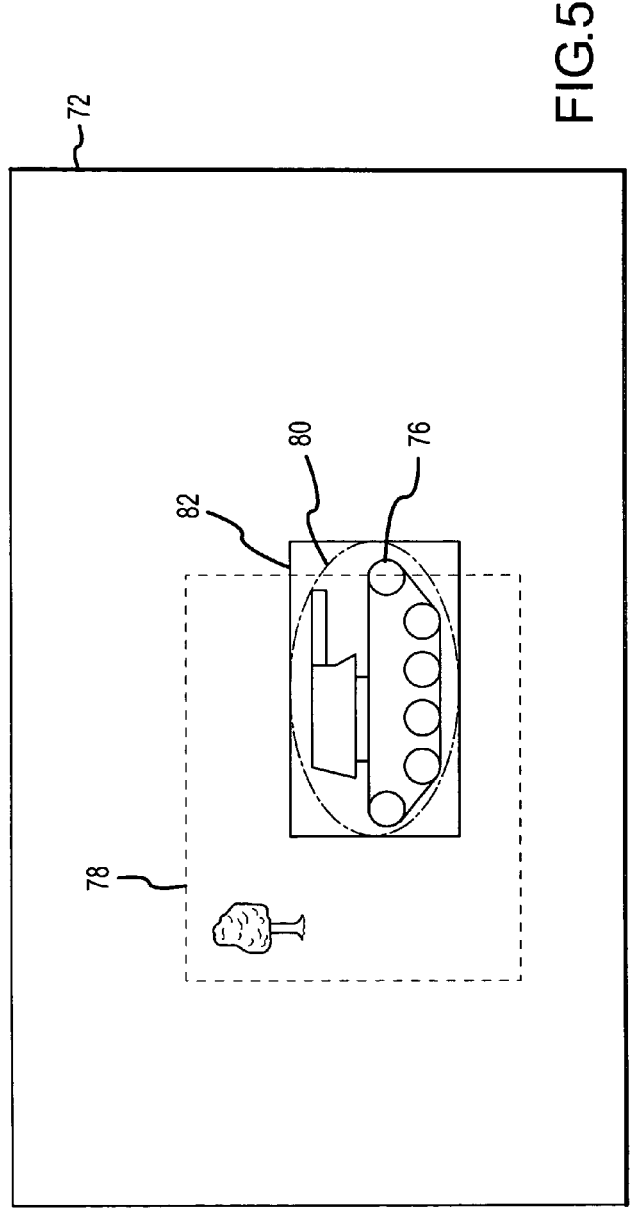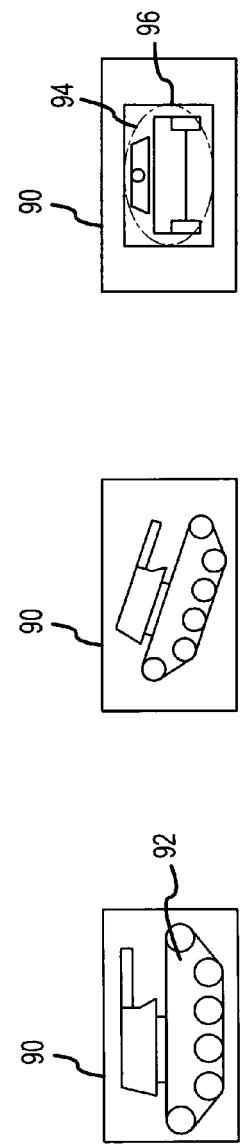

VEHICULAR TARGET ACQUISITION AND TRACKING USING A GENERALIZED HOUGH TRANSFORM FOR MISSILE GUIDANCE

BACKGROUND OF THE INVENTION

1. Field of the Invention

This invention relates to target acquisition and tracking and more specifically to the use of a generalized Hough transform to detect vehicles in an image to improve target acquisition, tracking and aim point selection by air and ground launched missiles.

2. Description of the Related Art

Precision image guided air-to-surface missiles are widely used against vehicular targets. These missiles include a seeker located near the nose of the missile to guide the missile to the intended target. A seeker consists of an imager and a tracker to perform the guidance function. The imager, typically infrared, located near the nose of the missile creates an image of the scene. The images are presented to the tracker which locates the position of the target in the image continuously. The tracker's estimated position of the target in the image is used to guide the missile to impact the target. The process of finding the target position in the image is called "tracking". Central to the imaging tracker is the track gate, which encloses the target to be tracked and delineates that portion of the image as target-occupied.

Target position is derived from the position of persistent features within the track gate. When the track gate is too large, then non-target elements, called background clutter, are also included in the track gate. The features that belong to background will perturb the track point away from the desired point on the target. When the target moves differently from the background clutter in the track gate, the background in the track gate can move the track gate and the track point off of the target and cause the missile to miss the target. This is called a "breaklock". To minimize breaklocks, it is essential that the track gate be as conformal to the target as possible to exclude background clutter. However, a number of conditions have militated against the maintenance of a conformal gate. These conditions often lead to catastrophic breaklocks or cause the track point to impact an undesirable portion of the target.

Breaklock and other related problems have several causes in different guided missile systems including: gate handoff from the automatic target recognizer (ATR) to the missile tracker, changing aspect ratio of maneuvering targets, limited lock-on after launch (LOAL), aimpoint designation and fire control system to missile tracker handover.

In many emerging military applications, targets are found by automatic target recognizers. These ATRs estimate the position and size of the target in the image and handoff an initial track gate to the missile tracker. However, these gates are often not sufficiently conformal to the target and include a large amount of background clutter in the track gate. Simulation studies have shown that the probability of tracking the target with these poorly defined gates can be degraded by a factor of two relative to that achieved with a well defined gate.

When a target turns its aspect ratio changes. To maintain conformance with the target, the gate must adapt to the changing silhouette. Some older forms of trackers, the gated video tracker, were able to make the needed adaptation by segmenting out the target from the background in situations where there are large contrast difference between the target and the background. However, in cases where contrast is small or when the background is inhomogeneous, these trackers have a tendency to expand the gate to include appreciable background and cause a breaklock. In other cases where the target is inhomogeneous, these gated video trackers often collapse the gate to a locally high contrast region, for example a hotspot, and result in guiding the missile to a less vulnerable portion of the target. A separate class of imaging trackers circumvents the problems of gate adaptation to background and gate collapse by maintaining a fixed gate aspect ratio and growing the gate solely on the basis of estimated range to target. Because the track gate's aspect ratio is fixed, the gate will not be conformal to the target boundary when it turns. If the apparent target silhouette shrinks due to turning, then the track gate will be too large and will include background clutter that may induce a breaklock.

In network centric warfare the observer and shooter are physically separated. In this environment weapons need to have a post launch automatic target acquisition capability. For precision guidance against moving targets, there are two approaches that are currently under consideration. Approach 1 utilizes an ATR to scan the area and find a target. The problems with this approach are: (1) ATR technology is still in the development stage and its viability is not certain; (2) ATRs need expensive high resolution imagery and thus are not compatible with near term retrofit of legacy weapons systems. Approach 2, uses a laser designator and a laser receiver onboard the missile. The designator aims a laser beam at the target and the laser receiver homes in on the scattered laser beam. This is a well known technology but requires the designator to continuously designate the target until missile impact. The prolonged designation time renders the designator susceptible to detection by the enemy's threat warning receiver and significantly increases his mortality rate.

Against heavily armored targets such as main battle tanks, aimpoint selection is critical. It is not sufficient just to have the missile hit the target, the missile must impact the target in a location where the armor is relatively thin. Typically, this spot is not at the centroid of the target. Some current missiles home in on the centroid and use a large warhead to overwhelm the target. This approach is only applicable to large missiles that are carried by large platforms such as aircraft. Smaller, man-portable missiles are not effective. Other postulated approaches involve the use of ATRs. These approaches incur additional costs (for the ATR). Another current approach essentially assumes the track gate defines a rough boundary of the target and attempts to bias the aimpoint away from the center of the gate using prior knowledge of the target shape. This approach suffers from not knowing the aspect of the target and has generally resulted in large aimpoint dispersion.

During the target acquisition process, the target is often identified in a high resolution forward looking infrared (FLIR) either manually or with an ATR. Once the target is identified in the FLIR, the target information needs to be handed over to the missile to initialize the tracker. In the handover process, one needs to determine the relative lines of sight of the FLIR and the missile seeker. The state of the art for determination of the relative lines of sight is to use a boresight correlator. Boresight correlation is performed by first resampling the FLIR image to a coarser resolution to match the seeker's resolution. Next, the missile image is sent across a data bus and correlated against the re-sampled FLIR image. The correlation process is well known to those skilled in the art. The position of the correlation peak indicates the position of the center of the missile image relative to the FLIR's boresight (center of the FLIR's field of view). Once this relative boresight offset is known, the target position and size from the FLIR can then be mapped into the missile image. The problem with this approach is that a large amount of data (missile image) must be sent across the data bus. In many current systems, the data bus does not support this amount of data transfer.

SUMMARY OF THE INVENTION

The present invention provides a method for maintaining a conformal track gate to a vehicular target, improving aimpoint designation and facilitating efficient handover from fire control to a missile tracker.

This is accomplished by recognizing that most vehicles have silhouettes that may be described as a "rounded rectangle". The position and shape of such rounded rectangles is described in terms of 5 parameters ($x_c$, $y_c$, a, b, θ). In tracking problems, the position and size of the target, and hence the track gate, is approximately known. An image of a scene containing a vehicle is acquired through the track gate. Edge detection is performed on the image to produce a silhouette image of the vehicle. A Hough transform is then performed on the silhouette image to detect a best fit of the vehicle to a parameterized rounded rectangle given by:

$$\left[\frac{|(x-x_c)\cos\theta + (y-y_c)\sin\theta|}{a}\right]^n + \left[\frac{|-(x-x_c)\sin\theta + (y-y_c)\cos\theta|}{b}\right]^n = 1$$

wherein the vehicle resides in an x,y coordinate system with parameters including center coordinates $x_c$,$y_c$, semi-major and semi-minor axes a,b, an orientation Θ. These parameters are then passed to a missile tracker. Using the parameters of the "rounded rectangle", the track gate may be redefined to be more conformal to the boundaries of the target to exclude clutter and make the tracker less susceptible to breaklocks. This capability is used to improve gate handoff from the automatic target recognizer (ATR) to the missile tracker, changing aspect ratio of maneuvering targets, limited lock-on after launch (LOAL), aimpoint designation and fire control system to missile seeker handover.

In one embodiment, the invention is used to improve ATR Handoff. An image is acquired with the initial track gate provided by the ATR. The edge detection and Hough transform are performed to extract the rounded rectangle parameters. These parameters are then used to reposition and resize the track gate to make it more conformal with the target. The conformal track gate is then handed off to the missile tracker.

In a second embodiment, the invention is used to maintain lock on a maneuvering target. The edge detection and Hough transforms are performed periodically to detect changes in position and aspect ratio. As these parameters change, the track gate is updated to maintain conformance with the target.

In another embodiment, the invention is integrated with a LOAL weapons system. A designator illuminates a point near but not necessarily on the vehicular target, thus reducing the likelihood of detection. A laser receiver on the missile acquires the laser beam and cues the imager on the approximate position of the target. The imager then uses the present invention to acquire the target and initialize the tracker. Once the tracker is initialized, the missile guides to the target autonomously and needs no assistance from the laser designator. Thus, the designator only needs to illuminate for a short duration of time (sufficient for acquisition). The reduction in illumination time increases his probability of survival.

In another embodiment, the invention is used to provide precise aimpoint selection. The target aspect can be estimated from the orientation of the principal axis of the rounded rectangle and the dimensions of its semi-major and semi-minor axes. Using this information and prior knowledge of target shape, the position of the desired aimpoint relative to the centroid may be determined.

In another embodiment, the invention is used to efficiently pass target information from the fire control system on the launch platform to the missile seeker. Fire control find's the target's "rounded rectangle" in high resolution imagery and calculates the five parameters. The size parameters are then scaled based on the relative resolution of the missile seeker and the fire control imager. The five parameters and their associated uncertainties (for example, the uncertainty in relative boresight) are then sent across the data bus to the missile processor. Using these parameters, the missile processor searches for the same rounded rectangle within the defined search volume. Once the missile processor executes the present invention and finds the corresponding rounded rectangle, it initializes the tracker and commences the homing mission. In this way, up to 15 numbers are sent across the data bus instead of an entire image. The reduced data flow is supported by most systems.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 5 is a diagram illustrating the conformal track gate found using the present invention;

FIGS. 6a through 6c are a sequence of diagrams illustrating resizing of the conformal gate to track a maneuvering target;

DETAILED DESCRIPTION OF THE INVENTION

The present invention provides a method for acquiring and maintaining a conformal track gate to a vehicular target. This is accomplished by recognizing that most vehicles have silhouettes that may be described as a "rounded rectangle". As such, a method of describing the position and shape of such rounded rectangles in terms of 5 parameters ($x_c$, $y_c$, a, b, θ) was formulated. In tracking problems, the position and size of the target, and hence the track gate, is approximately known. This information is utilized to find the "rounded rectangle" that best fits edges that are extracted in the vicinity of the track gate. Using the parameters of the "rounded rectangle", the track gate may be redefined to be more conformal to the boundaries of the target to exclude clutter and make the tracker less susceptible to breaklocks. This capability is used to improve gate handoff from the automatic target recognizer (ATR) to the missile tracker, changing aspect ratio of maneuvering targets, limited lock-on after launch (LOAL), aimpoint designation and fire control system to missile seeker handover.

Extensive testing and image analysis has shown that the silhouette of military vehicles, tanks in particular, may be parameterized by an analytical function, $f(x_1, x_2, \ldots, x_n)$. In an image containing a collection of edge points, the subset of the edge points that correspond to boundaries of a target vehicle may be found by isolating those points that obey the defining equation $f(x_1, x_2, \ldots, x_n)$. In general, the parameter $X = (x_1, x_2, \ldots, x_n)$ is not known. The proposed method finds that X which is maximally occupied by the edge points in the image. We will call this optimal value $X_0$. The proposed invention finds $X_0$ using the method of Hough transform.

Figure 1:
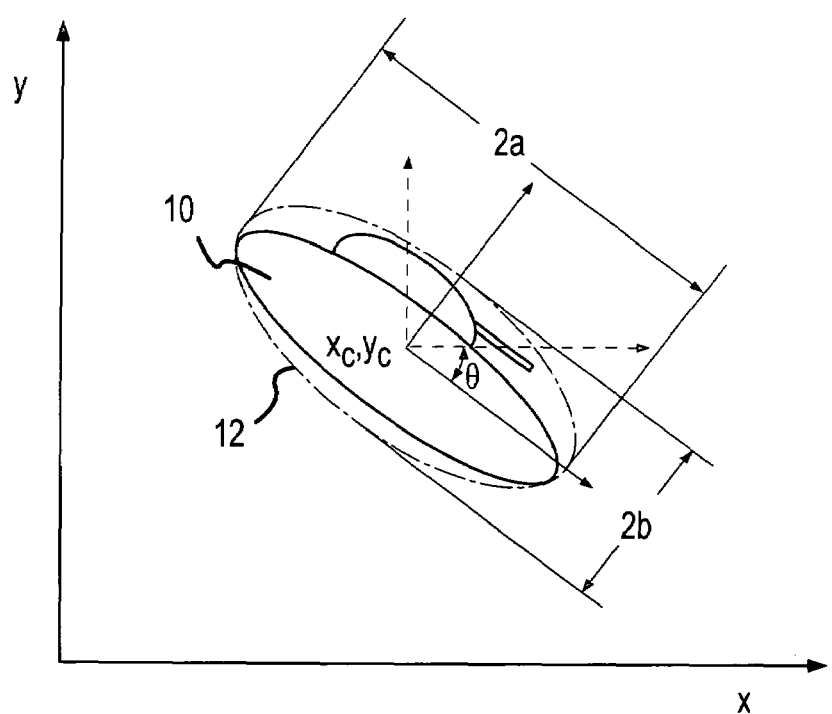
FIG. 1 is a silhouette of a vehicular target.

When viewed from almost any aspect, military vehicles 10 appear as "rounded rectangles" 12 as shown in FIG. 1. An analytical function which may be used to describe the rounded rectangular shape is given by:

$$\left[\frac{|(x-x_c)\cos\theta + (y-y_c)\sin\theta|}{a}\right]^n + \left[\frac{|-(x-x_c)\sin\theta + (y-y_c)\cos\theta|}{b}\right]^n = 1 \quad (1)$$

Thus, the position and size of the object are characterized by the five parameters $(x_c, y_c, \theta, a, b)$. The parameters $(x_c, y_c)$ describe the position; $\theta$ describes the orientation; and $(a,b)$ describes the size of the object in an x,y coordinate space.

By changing the value of the exponent n, varying shapes can be described. A value of $n=2$ corresponds to an ellipse. A value of $n=\infty$ corresponds to a rectangle. Although n may be selected to assume any value, analysis of image data and testing of the Hough transform algorithm suggest that values between 2 and 3 inclusive provide good results and values between 2.1 and 2.6 better results for typical military vehicles. These values were selected by offline analysis of a collection of representative sample vehicles with varying aspects and parametrically varying the value n to arrive at a value which best fits the samples.

Figure 2:
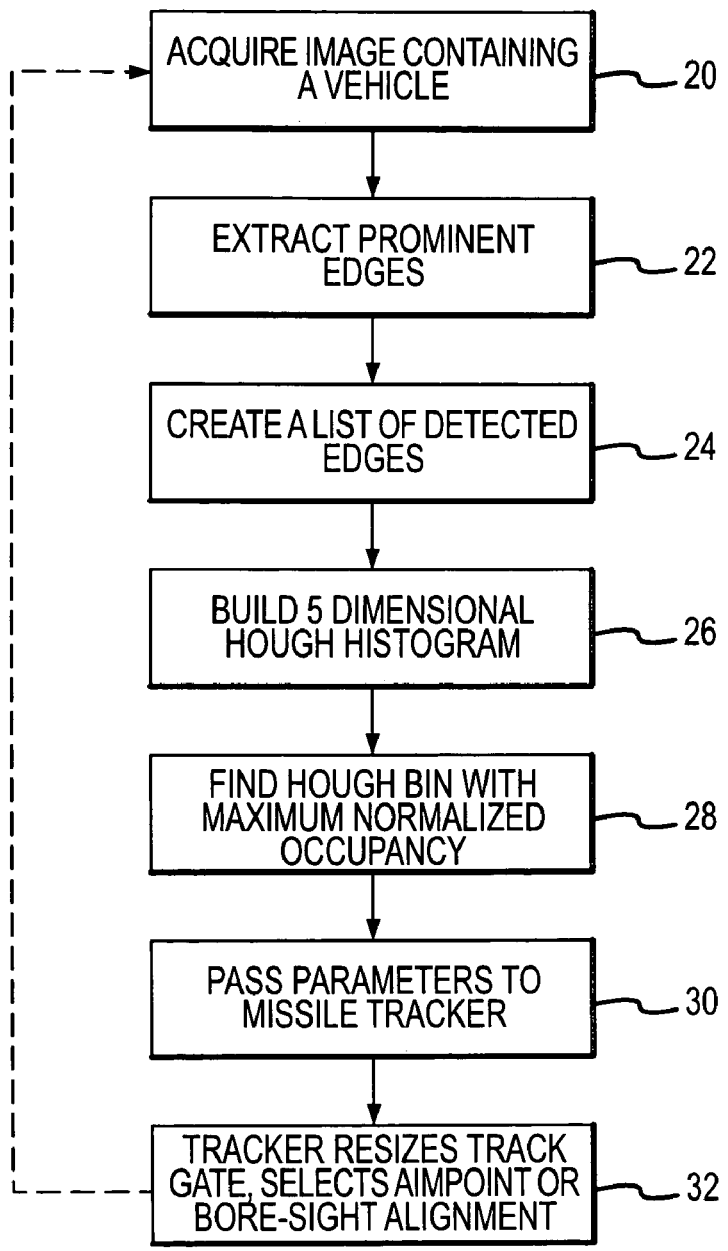
FIG. 2 is a flowchart for extracting rounded rectangle parameters for a vehicular target in accordance with the present invention.

As shown in FIG. 2, the method for extracting the parameters $(x_c, y_c, \theta, a, b)$ for a vehicular target starts with the acquisition of an image of a scene containing a vehicular target (step 20). In tracking problems, the position and size of the target, and hence a track gate for acquiring such an image, is approximately known. Typically images will be acquired in the infrared (IR) band, suitably in the LWIR region around 10 micrometers. However, the method will work on any image including those acquired in other IR bands or the visible band.

Edge detection is performed on the image to form a silhouette image comprised of the target boundary points (step 22). This is done by extracting prominent X and Y gradients in the image, computing the gradient magnitude, thinning the resulting edges and thresholding the image. In one embodiment, we used the Canny operator as the edge filter and defined prominent edges as those pixels whose gradient magnitude is at the $85^{th}$ percentile or higher when compared to all pixels in the image. Note that the process may leave some target boundaries un-extracted and may also produce extracted edge pixels on the background and on the interior of the target. Once complete, a list of detected edges is created (step 24).

Given the list of edges, the invention then tries to find the parameter set which most nearly fits the extracted edges. This is done by taking the coordinates of all of the extracted edge pixels $\{x, y\}$ and finding the particular $(x_c, y_c, \theta, a, b)$ that has the most edge points satisfying equation (1) above. The method for doing this is the general Hough transform. More specifically, a five dimensional Hough histogram is built (step 26) and the parameter set corresponding to the Hough bin having the maximum normalized occupancy is selected (step 28). This may be done for a single image or for a sequence of temporal images. Once selected, the parameter set is passed to the missile tracker (step 30). Depending upon the application, the missile tracker uses the parameters to resize/reposition the track gate, select precise aimpoint coordinates or adjust for bore-sight alignment (step 32).

The general Hough transform finds the set of parameters which is maximally supported by the data, in this case, the list of extracted edge points. In the case at hand, the Hough method sets up a five dimensional histogram where each dimension corresponds to one of the parameters to be searched. In our case, the five parameters are $(x_c, y_c, \theta, a, b)$. We can now imagine having bins spanning this five-dimensional space. The size of the bins is selected to balance the competing interests of positional accuracy, noise sensitivity and computational load. For each bin, we cycle through all of the detected edge points and plug the coordinate (x,y) of the detection into the left hand side of equation (1). If the equation is satisfied, then the occupancy of the bin is incremented by one. Satisfying the equation means that the detected edge points belongs to the rounded rectangle represented by the parameters of that bin. When all of the detected points are compared for all bins in the five-dimensional histogram, the bin with the maximum occupancy then describes the rounded rectangle which is most in conformity with the edge data. To avoid rewarding rounded rectangles with large (a,b) values, the metric used for selecting the most conforming rounded rectangle is the normalized occupancy, e.g. the occupancy count divided by the perimeter of the rounded rectangle defined by each bin. In this way, the best fitting rounded rectangle is the one with the highest percentage fill relative to its perimeter.

Although it is possible to directly compute the five-dimensional Hough transform, the memory requirements can be quite burdensome, on the order of $N^5$ where N is the number of bins per dimension. The value of N depends on the uncertainty in each parameter and on the resolution required. In our application to date, N typically takes on approximately 10 bins per dimension. To save memory the five dimensional Hough transform has implemented a series of two-dimensional Hough transforms. This sacrifices some accuracy but reduces the memory requirements to $N^2$.

Figure 3:
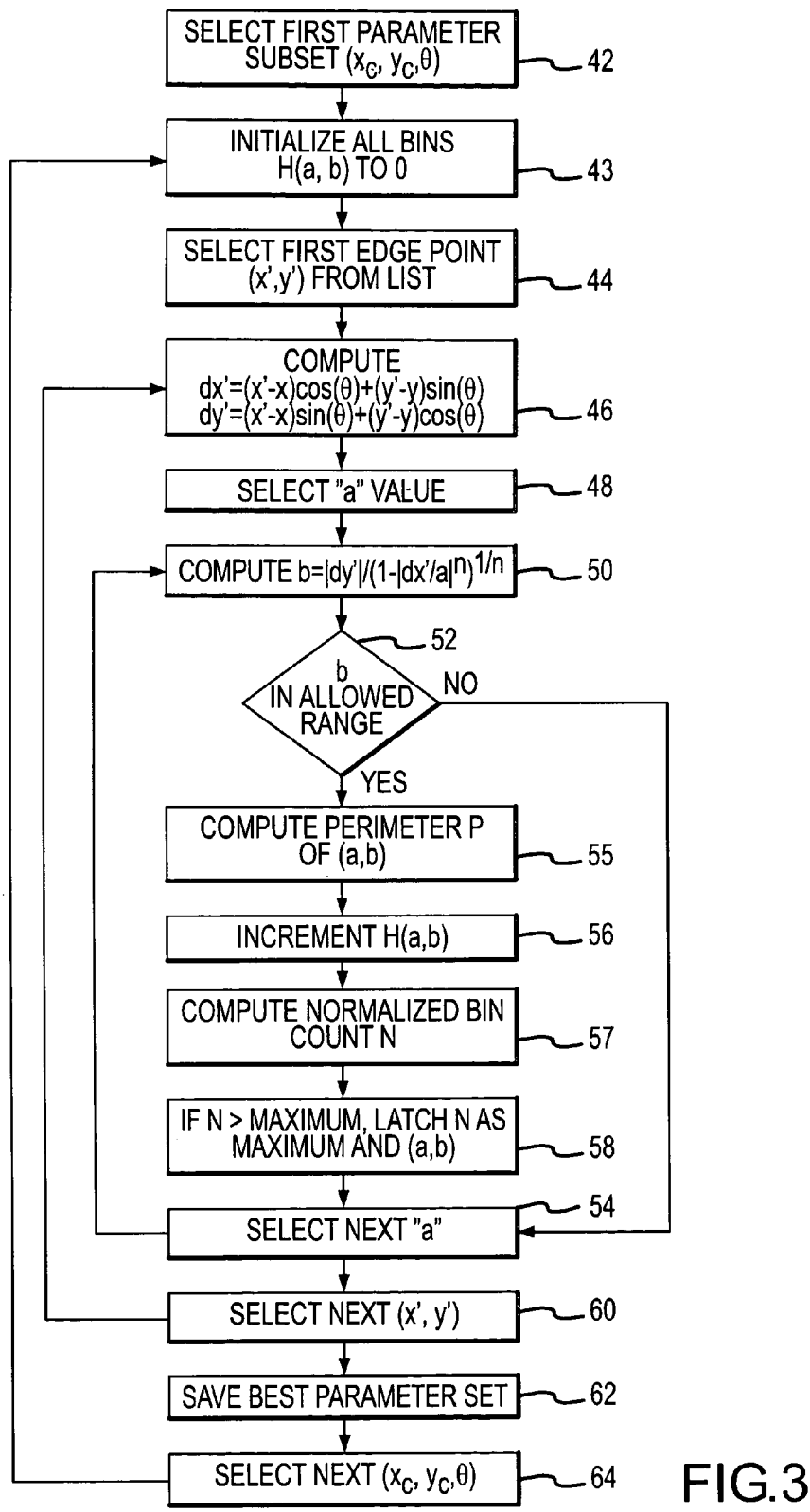
FIG. 3 is a flowchart of an implementation of the five dimensional Hough transform.

As shown in FIG. 3, the series of two-dimensional Hough transforms is implemented by partitioning the parameter set $(x_c, y_c, \theta, a, b)$ into the 2-dimensional set that will be searched by the two-dimensional Hough transform and the remaining three parameters. The parameters are bounded based on a priori knowledge including the image size, target size, range to target, etc. In this particular embodiment, the two-dimensional Hough transforms are computed in (a,b) for each point on the list of detected boundary points for each point in the three-dimensional space $(x_c, y_c, \theta)$ although any combination is possible. The best candidate rounded rectangle, if any, is stored for each two-dimensional transform. The best overall candidate is then selected as the best fit parameters for the target.

The first step is to select a first parameter subset $(x_c, y_c, \theta)$ (step 42) and to initialize the 2-dimensional histogram H(a,b) for this subset to 0 (step 43). Once the histogram is initialized a first edge point (x',y') on the list of detected boundary points is selected (step 44). At this point, the numerators dx' and dy' are computed (step 46) for parameter subset $(x_c, y_c, \theta)$ and edge point (x',y') as follows:

$$dx'=(x'-x)\cos(\Theta)+(y'-y)\sin(\Theta), \text{ and} \quad (2)$$

$$dy'=-(x'-x)\sin(\Theta)+(y'-y)\cos(\Theta). \quad (3)$$

The two-dimensional transforms are then calculated by selecting a first "a" value (bin) (step 48) and then solving for the "b" value (bin) that satisfies equation 1 (step 50) as follows:

$$b=|dy'|/(1-|dx'/a|^n)^{1/n} \quad (4)$$

If the calculated value for b does not lie in the allowed range (step 52), the next "a" value is selected (step 54) and another "b" value is computed (step 50). If the "b" value does lie within the allowed range, the perimeter P of the rounded rectangle with axis a,b is computed (step 55) as follows:

$$P=2\pi*[(a^n+b^n)/2]^{1/n} \quad (5)$$

The bin $H(x_c, y_c, \theta, a, b)$ is incremented (step 56) and a normalized value N is computed (step 57) by dividing the bin count by the perimeter. If the normalized count meets or exceeds a maximum value, it is latched at that maximum (step 58). This is done to select the "rounded rectangle" with the best fill factor as opposed to selecting a large rectangle with a relatively low fill factor. The algorithm selects the next "a" (step 54) and repeats the process. This is repeated until all of the "a" values are exhausted.

At this point the next edge point (x',y') on the list of detected boundary points is selected (step 60) and the entire process is repeated to find the parameter set $(x_c, y_c, \theta, a, b)$ with the highest normalized occupancy. This is repeated until all of the edge points (x',y') on the list are exhausted. At this point only the parameter set $(x_c, y_c, \theta, a, b)$ with the highest normalized occupancy need be saved (step 62).

Once the two-dimensional Hough transforms for each edge point on the list have been calculated and the "best" parameter set saved for the first parameter subset $(x_c, y_c, \theta)$, the next parameter subset is selected (step 64) and the entire process is repeated. This is repeated until all of the parameter subsets are exhausted. Finally, the parameter set $(x_c, y_c, \theta, a, b)$ having the highest normalized occupancy is passed out as the parameters for target vehicle.

The parameters $(x_c, y_c, \theta, a, b)$ of the "rounded rectangle" can be used to improve gate handoff from the automatic target recognizer (ATR) to the missile tracker, adapt to changing aspect ratio of maneuvering targets, acquire a target in a limited lock-on after launch (LOAL) system, improve aimpoint designation and to efficiently handoff target information from a fire control system to a missile seeker. In some applications, the present algorithm may be used in multiple places. For example, the algorithm could be used to provide a conformal track gate that is handed off to the tracker, to maintain the conformal track gate as the target maneuvers and to designate aimpoints on the target.

ATR Handoff

Figure 4:
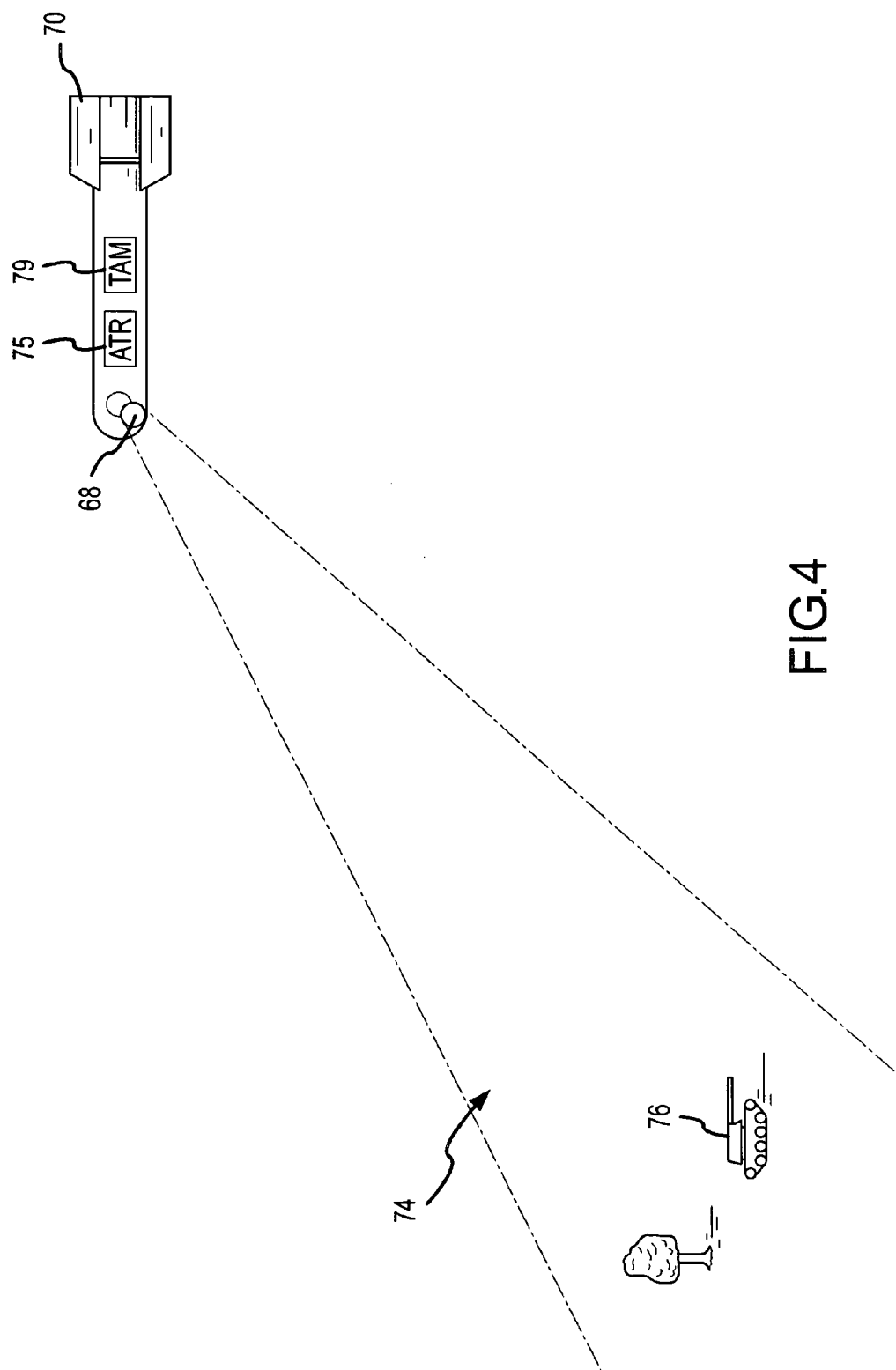
FIG. 4 is a diagram illustrating the handover from an ATR to the missile tracker.

As shown in FIGS. 4 and 5, the tracker 68 on a missile 70 acquires an image 72 of a scene within its field of view (FOV) 74. The ATR system 75 identifies a potential vehicular target 76 within the scene and generates an approximate track gate 78. Ordinarily this track gate, which may include background clutter and/or exclude a portion of the target, is handed off to the missile's guidance system. In accordance with the invention, a target acquisition module (TAM) 79 performs edge detection and the Hough transform on the image to extract the parameters for the rounded rectangle 80. These parameters are then used to reposition and resize the track gate 82 to make it more conformal with the target 76. The conformal track gate is then handed off to the missile tracker. By improving the track gate, the tracker is less susceptible to breaklocks.

Preliminary testing shows that the probability of tracking the target improved from 47 percent with the standard track gate to 98 percent with the conformal track gate. These tests were obtaining by running Monte-Carlo simulations where targets are embedded in digitized images of actual terrain. The tests include the functions of automatic target recognition, hand over to the missile tracker, automatic tracking for missile guidance and flying the missile to impact as directed by the tracker. The results represent the fraction of attempts where the missile impacted the intended target.

Target Tracking

To avoid breaklock it is important the track gate remain conformal to target as the missile tracks and finally impacts the target. As the range-to-target closes, the track gate as a percentage of the seeker's FOV grows. Furthermore, if the target maneuvers its aspect ratio will change. If the track gate does not effectively compensate for both it may become over or undersized and thus susceptible to breaklock. The described Hough transform algorithm provides the parameters that contain information to accommodate both the range closure and aspect ratio.

As shown in FIG. 6a, an initial track gate 90 is fairly conformal with the target 92. Assuming that range-to-closure has been compensated, as the target starts to turn the track gate 90 becomes oversized as shown in FIG. 6b. As shown in FIG. 6c, once the target has turned ninety-degrees the original track gate 90 (compensated for range closure) is too big and is susceptible to breaklock. The TAM computes the Hough transform, which not only compensates for range closure but changes in aspect ratio as well. The best fit rounded rectangle 94 produces a resized conformal track gate 96 that is a much better fit to the target.

Limited Lock-On After Launch (LOAL)

Figure 7:
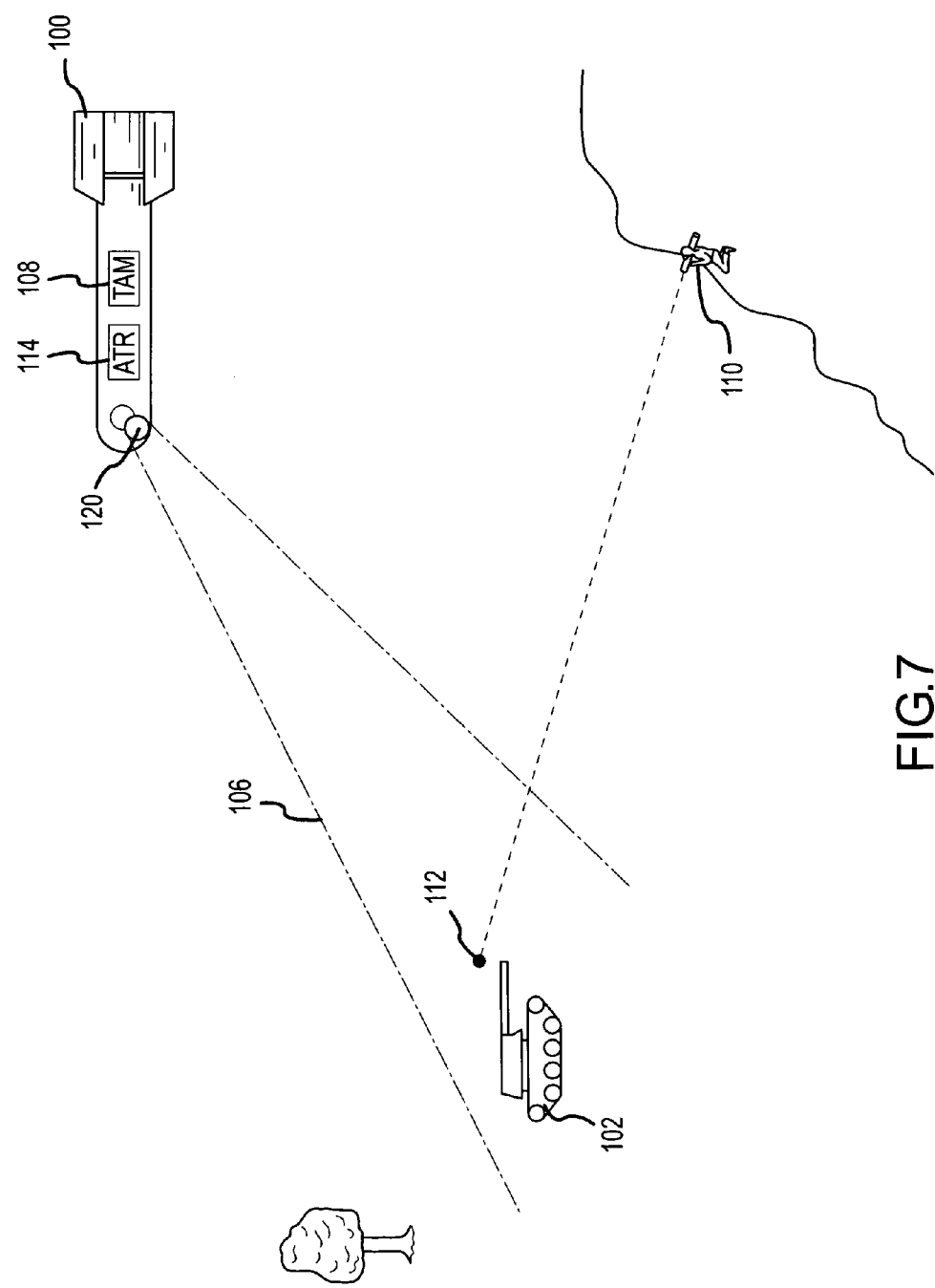
FIG. 7 is a diagram illustrating a LOAL in a network centric environment.
Figure 8:
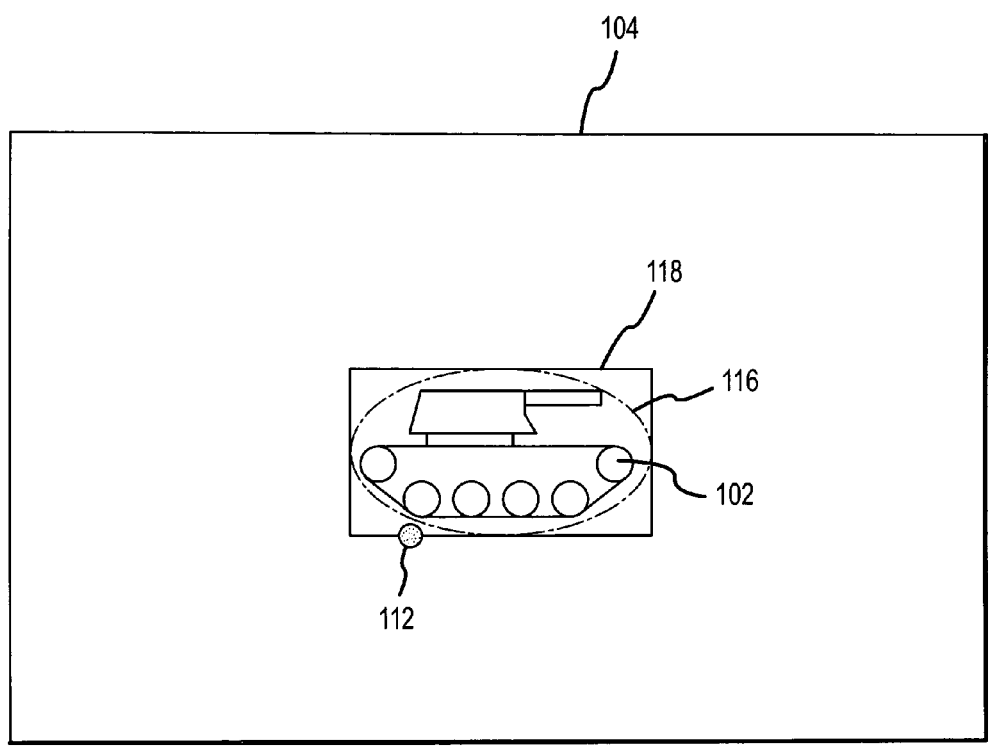
FIG. 8 is a diagram illustrating the conformal gate.

FIGS. 7 and 8 illustrate the use of the Hough transform to provide a conformal track gate in a LOAL mode for missile guidance. In network centric warfare, a missile 100 is launched into a "basket" and flies to the vicinity of the target 102 to be engaged using inertial guidance, GPS navigation, or semi-active laser cueing. Using any one of these means, the missile sensor continuously acquires images 104 of the scene within its FOV 106. The TAM 108 on the missile computes the Hough transform and generates the conformal track gate acquiring the target given it is in the neighborhood of the cue.

In the illustrated embodiment, semi-active laser cueing is used. A forward observer 110 illuminates a laser spot 112 near but not necessarily on the vehicular target, thus reducing the likelihood of detection. A laser receiver 114 on the missile acquires the laser beam and cues the imager on the approximate position of the target. The TAM computes the best fit rounded rectangle 116 and forwards a conformal track gate 118 to acquire the target and initialize the tracker 120. Once the tracker is initialized, the missile guides to the target autonomously and needs no assistance from the observer. Thus, the observer only needs to illuminate for a short duration of time (sufficient for acquisition). The reduction in illumination time increases his probability of survival.

Aimpoint Designation

Against heavily armored targets such as main battle tanks, aimpoint selection is critical. It is not sufficient just to have the missile hit the target, the missile must impact the target in a location where the armor is relatively thin. Typically, this spot is not at the centroid of the target. Some current missiles home in on the centroid and use a large warhead to overwhelm the target. This approach is only applicable to large missiles that are launched from large platforms such as aircraft. Smaller, man-portable missiles are not effective.

The parameters calculated to provide and maintain a conformal track gate can also be used to provide precise aimpoint selection. The target aspect can be estimated from the orientation of the principal axis of the rounded rectangle and the dimensions of its semi-major and semi-minor axes. Using this information and prior knowledge of target shape, the position of the desired aimpoint relative to the centroid may be determined.

Figure 9:
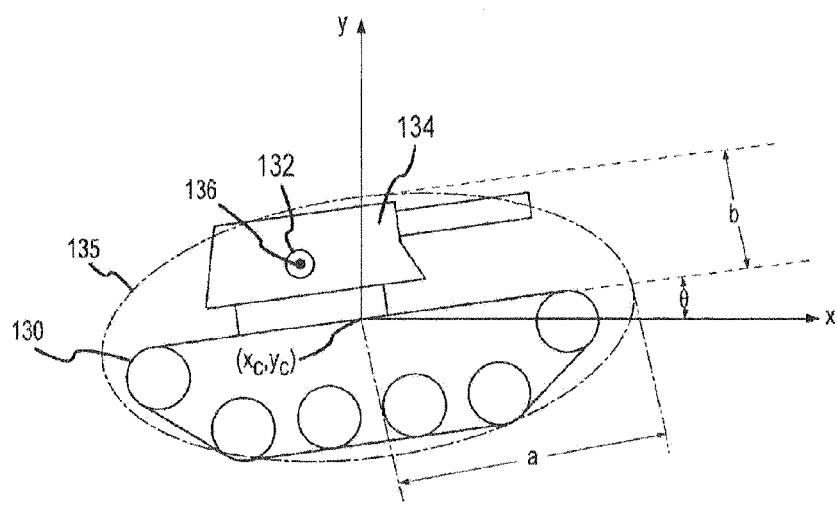
FIG. 9 is a diagram of the parameterized rounded rectangle for aimpoint selection.

As shown in FIG. 9, the target is a main battle tank 130 that is heavily armored and well defended against most man-portable missiles. However, the tank has a weak point at, for example, the hatch 132 on top of the turret 134. If even a relatively small missile can be guided to impact the hatch 132, the tank may be disabled or destroyed. The TAM uses knowledge of the tank design to generate the best fit rounded rectangle 135 and the ($x_c$, $y_c$, θ, a, b) parameters. The TAM uses the parameters to compute an aimpoint 136 that coincides with hatch 132. The precise coordinates of the aimpoint are passed to the missile guidance module for missile homing.

Fire Control System Handover

Figure 10:
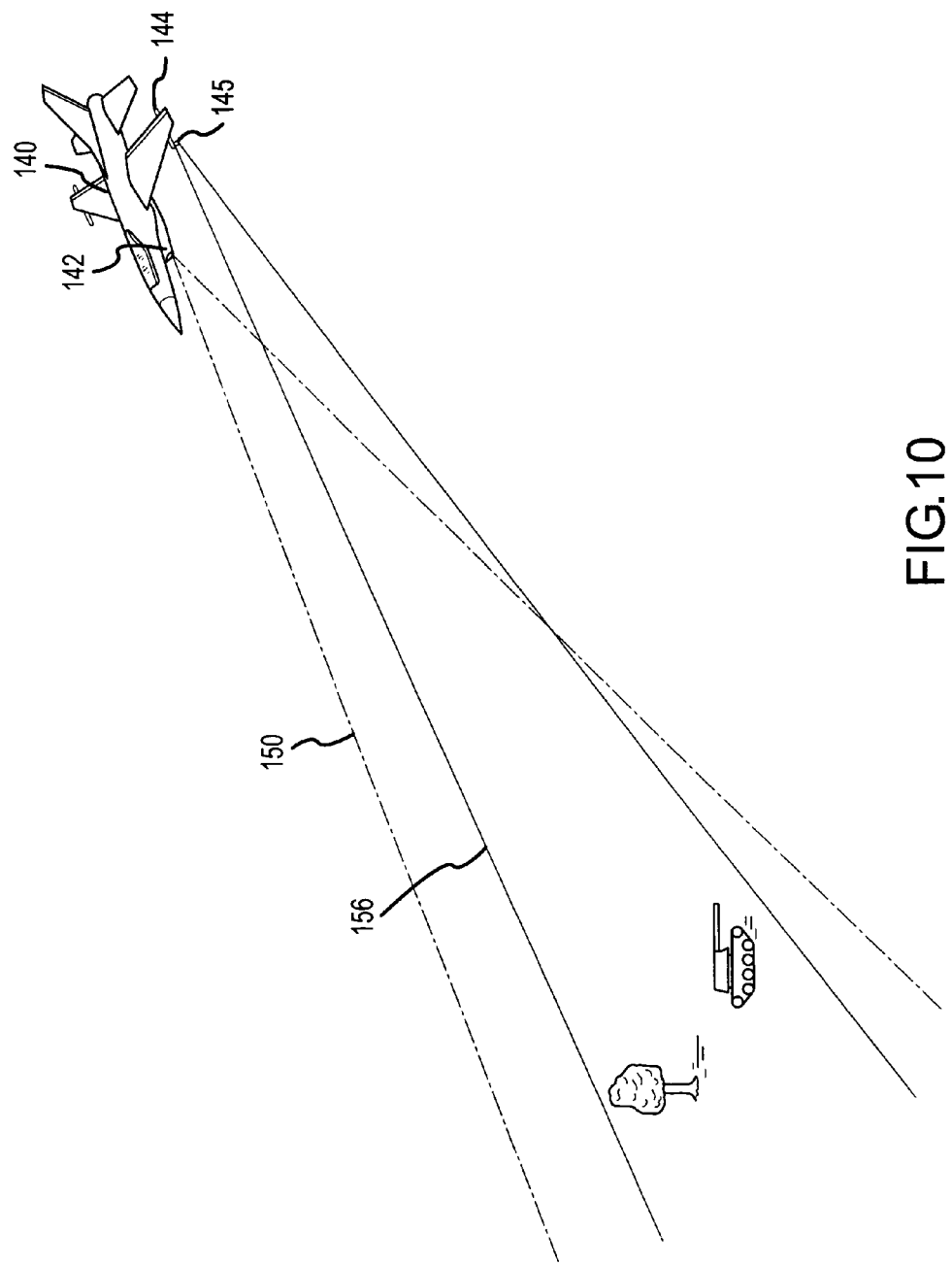
FIG. 10 is a diagram illustrating handover from a FLIR to the missile seeker.
Figure 11:
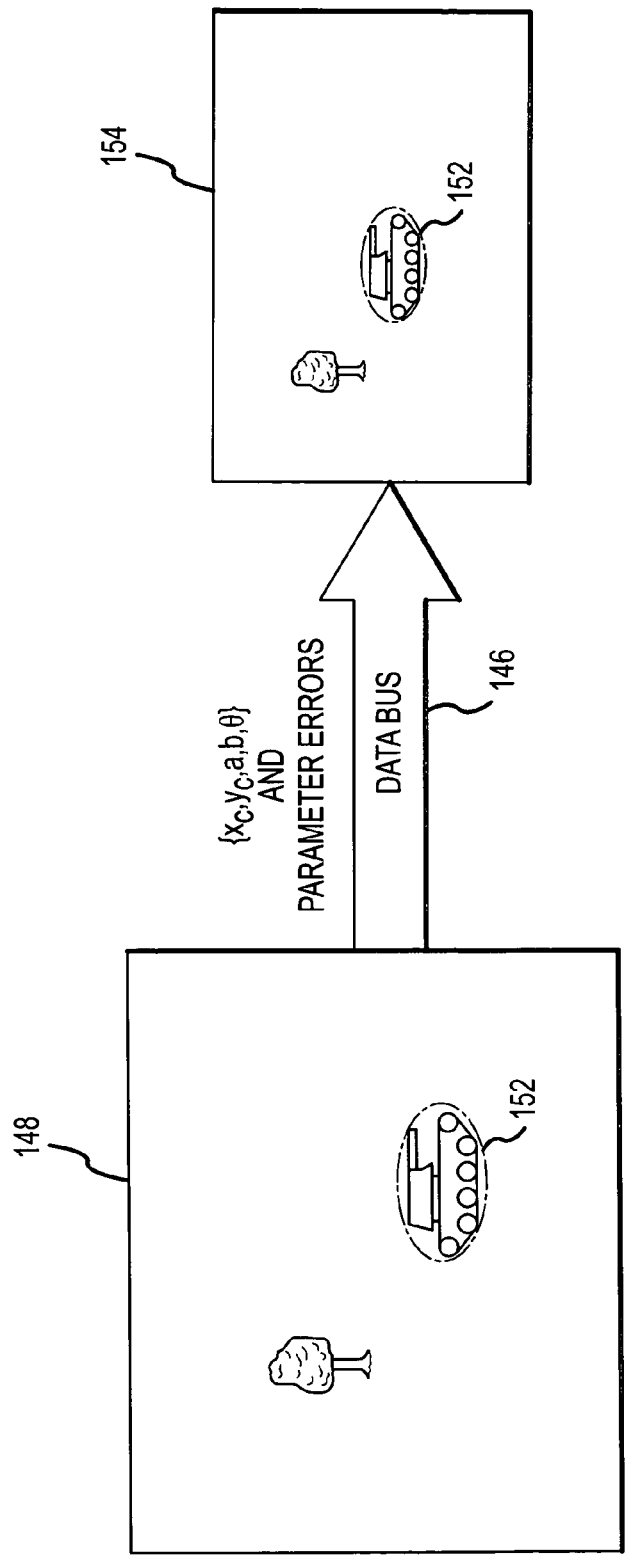
FIG. 11 is a diagram illustrating handover of the parameters for the rounded rectangle from the FLIR to the missile seeker.

The Hough transform parameters can be used to efficiently pass target information from the fire control system on the launch platform to the missile tracker. As shown in FIG. 10, a military aircraft 140 is provided with a forward looking infrared (FLIR) system 142 that includes a high resolution imager and a target acquisition module (TAM) and at least one missile 144 that includes a missile seeker 145 having a low resolution imager and a target acquisition module. As shown in FIG. 11, the FLIR and missile seeker communicate information over a low bandwidth channel such as a data bus 146. The FLIR's high resolution image acquires high resolution images 148 of the scene within its FOV 150. The FLIR's TAM computes the Hough transform on the high resolution image and outputs the rounded rectangle 152 and associated parameters. The size parameters are then scaled based on the relative resolution of the missile and the fire control imager. The five parameters and their associated uncertainties (for example, the uncertainty in relative boresight) are then sent across the data bus 146 to the missile TAM. Using these numbers, the missile TAM searches for the same rounded rectangle 152 within a constrained space in a low resolution image 154 acquired by the missile tracker in its FOV 156. The TAM initializes the tracker and commences the homing mission. In this way, up to 15 numbers are sent across the data bus instead of an entire image. The reduced data flow is supported by most systems.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method, comprising:
   acquiring an image of a scene containing a vehicle;
   performing edge detection on the image to produce a silhouette image;
   performing a Hough transform with parameters including center coordinates $x_c$, $y_c$, major and minor axes a,b, and orientation Θ on the silhouette image to detect a best fit of a parameterized object to the vehicle; and
   passing position, size and orientation parameters of the object to a missile tracker.

2. The method of claim 1, wherein the parameterized object is a rounded rectangle.

3. The method of claim 2, wherein the rounded rectangle is given by:

$$\left[\frac{|(x-x_c)\cos\theta + (y-y_c)\sin\theta|}{a}\right]^n + \left[\frac{|-(x-x_c)\sin\theta + (y-y_c)\cos\theta|}{b}\right]^n = 1$$

wherein the vehicle lies along the x and y axes with parameters including center coordinates $x_c$, $y_c$, major and minor axes a,b, and orientation Θ.

4. The method of claim 3, wherein exponent n assumes a range of values so that the rounded rectangle ranges from an ellipse to a rectangle.

5. The method of claim 3, wherein exponent n lies between 2 and 3 inclusive.

6. The method of claim 3, wherein exponent n lies between 2.1 and 2.6 inclusive.

7. The method of claim 3, wherein exponent n is selected by offline analysis of a collection of representative sample vehicles with varying aspects and parametrically varying the value n to arrive at a value which best fits the samples.

8. The method of claim 1, wherein the Hough transform is computed as a sequence of 2D Hough transforms by fixing three of the parameters ($x_c$, $y_c$, a, b, θ), computing a 2D Hough transform for the other two parameters, and iterating on the three fixed parameters.

9. The method of claim 1, wherein the Hough transform is normalized by the perimeter of the parameterized object to determine the best fit.

10. The method of claim 1, further comprising:
    placing an initial track suite that does not conform to the vehicle over the vehicle, said edge detection being performed on the portion of the image within the track gate to produce the silhouette image;
    adjusting the position and size of the track gate based on said position, size and orientation parameters so that said track gate is approximately conformal with the vehicle; and
    passing the conformal track gate to the missile tracker.

11. The method of claim 10, wherein the initial track gate is acquired from an automatic target recognizer (ATR) on the missile and the missile tracker's target acquisition module performs the edge detection and Hough transform to adjust the track gate.

12. The method of claim 11, wherein the missile tracker's target acquisition module periodically updates the parameters to adjust the track gate to account for aimpoint drift during tracking or vehicle maneuvering.

13. The method of claim 11, wherein the image is acquired with a high resolution off-missile imager and the parameters are computed with an off-missile target acquisition module and passed to the missile having a low resolution imager with a different line-of-sight than the high resolution imager, said missile tracker's target acquisition module recomputing the Hough transform in a constrained parameter space based on the parameters to estimate the line-of-sight difference between the missile and the off-missile imager.

14. The method of claim 10, wherein the initial track gate is positioned on or near the vehicle by a laser designator.

15. The method of claim 1, further comprising selecting an aimpoint on the vehicle based on the position, size and orientation parameters.

16. A method, comprising:
- acquiring an image of a scene containing a vehicle with a high resolution off-missile imager;
- performing edge detection on the image to produce a silhouette image;
- performing a Hough transform on the silhouette image to detect a best fit of a parameterized object to the vehicle; and
- passing position, size and orientation parameters of the object from the high resolution imager to a missile seeker on a missile over a low bandwidth channel, said missile seeker including a low resolution imager that acquires low resolution images of the scene with a different line-of-sight than the high resolution imager and a missile tracker that recomputes the Hough transform on the low resolution images in a constrained spaced based on the parameters to compensate for the different line-of-sight.

17. A method, comprising:
- acquiring an image of a scene containing a vehicle;
- performing edge detection on the image to produce a silhouette image;
- performing a Hough transform on the silhouette image to detect a best fit of the vehicle to a parameterized rounded rectangle given by:

$$\left[\frac{|(x-x_c)\cos\theta + (y-y_c)\sin\theta|}{a}\right]^n + \left[\frac{|-(x-x_c)\sin\theta + (y-y_c)\cos\theta|}{b}\right]^n = 1$$

wherein the vehicle lies along the x and y axes with parameters including center coordinates $x_c$, $y_c$, major and minor axes a,b, an orientation $\Theta$ and exponent n; and
- passing parameters $x_c$, $y_c$, a, b, $\theta$ to a missile tracker.

18. The method of claim 17, wherein exponent n lies between 2 and 3 inclusive.

19. The method of claim 18, wherein exponent n lies between 2.1 and 2.6 inclusive.

20. The method of claim 17, wherein the Hough transform is computed as a sequence of 2D Hough transforms by fixing three of the parameters ($x_c$, $y_c$, a, b, $\theta$), computing a 2D Hough transform for the other two parameters, and iterating on the three fixed parameters.

21. The method of claim 20, wherein the Hough transform is normalized by the perimeter of the parameterized object to determine the best fit.

22. The method of claim 17, wherein the image is acquired with a track gate, further comprising:
- Adjusting the position and size of the track gate based on said position, size and orientation parameters so that said track gate is approximately conformal with the vehicle.

23. An apparatus, comprising:
- a missile;
- an imager for acquiring an image of a scene containing a vehicle;
- an automatic target recognizer (ATR) for placing an initial non-conforming track gate over the vehicle in the image; and
- a missile tracker including a target acquisition module for acquiring a vehicle said target acquisition module performing edge detection on a portion of the image within the track gate to produce a silhouette image and performing a Hough transform on the silhouette image to fit a parameterized object to the vehicle and using the position, size and orientation parameters of the object to adjust the track gate so that it is approximately conformal with the vehicle, said missile tracker using the conformal track gate to track the acquired vehicle to impact.

24. The apparatus of claim 23, wherein the Hough transform is performed with parameters including center coordinates $x_c$, $y_c$, major and minor axes at a,b, and orientation $\Theta$.

25. The apparatus of claim 23, wherein the imager acquires images of the vehicle through the conformal track gate, said target acquisition module periodically recomputing the Hough transform to update the parameters to maintain a track gate that is approximately conformal with the vehicle.

26. The apparatus of claim 23, wherein the missile tracker's targets acquisition module selects an aimpoint on the vehicle based on the position, size and orientation parameters.

27. An apparatus, comprising:
- A missile;
- a high resolution off-missile imager that acquires high resolution images of the scene;
- an off-missile target acquisition module that computes the Hough transform on the high resolution image and outputs the parameters;
- a low bandwidth channel that communicates the parameters to the missile; and
- a missile seeker including
  - a low resolution on-missile imager that acquires low resolution images of the scene with a different line-of-sight than the high resolution imager; and
  - a missile tracker having an on-missile target acquisition module that receives the parameters and recomputes the Hough transform on the low resolution images in a constrained space based on the parameters to compensate for the different line-of-sight and passes the parameters to the missile tracker.

28. A method of tracking a target vehicle from a missile, comprising:
- acquiring an image of a scene containing a vehicle;
- placing an initial track gate around the vehicle;
- using a missile tracker's target acquisition module to (a) perform edge detection on the portion of the image within the track gate to produce a silhouette image, (b) perform a Hough transform on the silhouette image to fit a parameterized object to the vehicle to extract position, size and orientation parameters of the object and (c) adjust the track gate based on said position, size and orientation parameters so that said track gate is approximately conformal with the vehicle; and
- passing the conformal track gate to the missile tracker to track the acquired vehicle to impact.

29. The method of claim 28, wherein an automatic target recognizer (ATR) places the initial track gate around the vehicle.

* * * * *